US008880744B2

(12) United States Patent
Manmohan

(10) Patent No.: US 8,880,744 B2
(45) Date of Patent: Nov. 4, 2014

(54) CONFIGURATION REGISTRY SYSTEMS AND METHODS

(75) Inventor: Sarin Sumit Manmohan, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 966 days.

(21) Appl. No.: 12/965,712

(22) Filed: Dec. 10, 2010

(65) Prior Publication Data

US 2012/0151501 A1    Jun. 14, 2012

(51) Int. Cl.
*G06F 3/00* (2006.01)
*G06F 9/455* (2006.01)
*G06F 9/445* (2006.01)
*G06F 9/44* (2006.01)

(52) U.S. Cl.
CPC .............. *G06F 9/44* (2013.01); *G06F 9/44505* (2013.01)
USPC .................................................. 710/6; 718/1

(58) Field of Classification Search
CPC ..................................................... G06F 9/445
USPC .......................................................... 710/6
See application file for complete search history.

(56) References Cited

U.S. PATENT DOCUMENTS

| 6,779,179 B1 * | 8/2004 | Romm et al. ................. 717/178 |
| 8,291,493 B2 * | 10/2012 | Faieta et al. .................... 726/22 |
| 8,464,253 B2 * | 6/2013 | Kim et al. ......................... 718/1 |

* cited by examiner

*Primary Examiner* — Titus Wong
(74) *Attorney, Agent, or Firm* — Wilmer Cutler Pickering Hale and Dorr LLP

(57) ABSTRACT

Registry information systems and methods are presented. In one embodiment, an application dedicated registry hive method comprises: performing application dedicated registry hive agent operations, including: an online initiation phase in which a system independent application dedicated registry hive from a shared resource is loaded into the system namespace; a monitoring phase in which status of the system independent application dedicated registry hive is monitored; and an offline initiation phase in which the system independent application dedicated registry hive is unloaded from the system namespace; and performing an application dedicated registry hive driver filter process, including redirecting read and write operations to the system independent application dedicated registry hive. The system independent application dedicated registry hive can include a registry content file and a corresponding transaction log file.

24 Claims, 11 Drawing Sheets

200

210
Performing application operations on a first system while utilizing an application dedicated registry hive process.

220
Switching application operations from the first system to a second system including utilizing an application dedicated registry hive process to facilitate the switchover.

230
Performing application operations on a second system while utilizing an application dedicated registry hive process.

Performing application dedicated registry hive agent operations, including an online initiation phase, a monitoring phase and an offline initiation phase.

320

Performing an application dedicated registry hive driver filter process, including redirecting write operations associated with the system independent application dedicated registry hive.

510
Determining if a system independent application dedicated registry hive already exists for an application.

520
Creating the system independent application dedicated registry hive including a registry content file and a corresponding transaction log file on a shared resource.

530
Loading the system independent application dedicated registry hive into a system namespace.

540
Configuring permissions on the system independent application dedicated registry hive for application access.

550
Directing registry drive filter configuration so that write operations for the application are redirected to the system independent application dedicated registry hive.

560
Starting the application.

610
Ensuring the system independent application dedicated registry hive is loaded in a system name space.

620
Ensuring the application dedicated registry hive driver filter is running on a system.

710
Stopping an application.

720
Notifying the application dedicated registry hive driver filter process to stop filter operation associated with the system.

730
Flushing uncompleted write operations.

740
Unloading the system independent application dedicated registry hive from the system.

FIG 7

CONFIGURATION REGISTRY SYSTEMS AND METHODS

FIELD OF THE INVENTION

The present embodiments relate to the field of computer configuration registry systems and methods.

BACKGROUND OF THE INVENTION

Electronic systems and circuits are often utilized in a number of applications to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of important and confidential information and significant resources are expended storing and processing the information. Maintaining and tracking the information is often very important for a variety or reasons (e.g., recovery, corruption correction, etc.).

Traditionally, many applications store data in a registry file. For example, traditional application configuration information can be stored in a registry file. Changes that are done are typically local to the system registry. In the event of an application failover, if this data is not available on the failover node the application may not start or may start with an old configuration. Moreover the registry configuration is usually binary data that is replicated and not highly available in a transaction consistent format. Traditional attempts using Registry backup and restore APIs (e.g., RegSaveKey/RegRestoreKey, etc.) are usually not transaction consistent and do not usually scale in terms of performance (CPU/Memory/TO) when the configuration data is large.

SUMMARY

Registry information systems and methods are presented. In one embodiment, an application dedicated registry hive method comprises: performing application dedicated registry hive agent operations, including: an online initiation phase in which a system independent application dedicated registry hive from a shared resource is loaded into the system namespace; a monitoring phase in which status of the system independent application dedicated registry hive is monitored; and an offline initiation phase in which the system independent application dedicated registry hive is unloaded from the system namespace; and performing an application dedicated registry hive driver filter process, including redirecting write operations to the system independent application dedicated registry hive. Read operations can also be redirected. The system independent application dedicated registry hive can include a registry content file and a corresponding transaction log file. The write operations can also be directed to a local resource and information associated with the corresponding write is also stored on the local resource. In one embodiment, the process further comprises resolving inconsistencies in the system independent application dedicated registry hive information.

In one embodiment the online initiation phase comprises: determining if a system independent application dedicated registry hive already exists for an application, wherein the system independent application dedicated registry hive includes a registry content file and a corresponding transaction log file on a shared resource; creating the system independent application dedicated registry hive on the shared resource if the system independent application dedicated registry hive does not already exist; loading the system independent application dedicated registry hive into a system namespace; configuring permissions on the system independent application dedicated registry hive for application access; directing registry driver filter configuration so that write operations for the application are redirected to the system independent application dedicated registry hive; and starting the application. The monitoring phase can include: ensuring the system independent application dedicated registry hive is loaded in a system name space; and ensuring the application dedicated registry hive driver filter is running on a system. The offline initiation phase can comprise: stopping the application; notifying the application dedicated registry hive driver filter process to stop filter operation associated with the system; and unloading the system independent application dedicated registry hive from the system.

In one embodiment a system includes a reprogrammable tangible computer readable storage medium having stored thereon, computer executable instructions that, when executed by a computer system cause the computer system to perform a method comprising: performing application dedicated registry hive agent operations, including: an online initiation phase in which a system independent application dedicated registry hive from a shared resource is loaded into the system namespace; a monitoring phase in which status of the system independent application dedicated registry hive is monitored; and an offline initiation phase in which the system independent application dedicated registry hive is unloaded from the system namespace; and performing an application dedicated registry hive driver filter process, including redirecting write operations to the system independent application dedicated registry hive. Read operations can also be redirected. The system independent application dedicated registry hive can include a registry content file and a corresponding transaction log file. The write operations can also be directed to a local resource and information associated with the corresponding write is also stored on the local resource. In one embodiment, the process further comprises resolving inconsistencies in the system independent application dedicated registry hive information.

In one embodiment the online initiation phase comprises: determining if a system independent application dedicated registry hive already exists for an application, wherein the system independent application dedicated registry hive includes a registry content file and a corresponding transaction log file on a shared resource; creating the system independent application dedicated registry hive on the shared resource if the system independent application dedicated registry hive does not already exist; loading the system independent application dedicated registry hive into a system namespace; configuring permissions on the system independent application dedicated registry hive for application access; directing registry driver filter configuration so that write operations for the application are redirected to the system independent application dedicated registry hive; and starting the application. Read operations can also be redirected. The monitoring phase can include: ensuring the system independent application dedicated registry hive is loaded in a system name space; and ensuring the application dedicated registry hive driver filter is running on a system. The offline initiation phase can comprise: stopping the application; notifying the application dedicated registry hive driver filter process to stop filter operation associated with the system; and unloading the system independent application dedicated registry hive from the system.

In one embodiment a computer system comprises a processor coupled to a computer readable storage media and executing computer readable code which causes the computer system to perform operations including: performing application dedicated registry hive agent operations, including: an online initiation phase in which a system independent application dedicated registry hive from a shared resource is loaded into the system namespace; a monitoring phase in which status of the system independent application dedicated registry hive is monitored; and an offline initiation phase in which the system independent application dedicated registry hive is unloaded from the system namespace; and performing an application dedicated registry hive driver filter process, including redirecting write operations to the system independent application dedicated registry hive. The system independent application dedicated registry hive can include a registry content file and a corresponding transaction log file. The write operations can also be directed to a local resource and information associated with the corresponding write is also stored on the local resource. In one embodiment, the process further comprises resolving inconsistencies in the system independent application dedicated registry hive information.

In one embodiment the online initiation phase comprises: determining if a system independent application dedicated registry hive already exists for an application, wherein the system independent application dedicated registry hive includes a registry content file and a corresponding transaction log file on a shared resource; creating the system independent application dedicated registry hive on the shared resource if the system independent application dedicated registry hive does not already exist; loading the system independent application dedicated registry hive into a system namespace; configuring permissions on the system independent application dedicated registry hive for application access; directing registry driver filter configuration so that write operations for the application are redirected to the system independent application dedicated registry hive; and starting the application. The monitoring phase can include: ensuring the system independent application dedicated registry hive is loaded in a system name space; and ensuring the application dedicated registry hive driver filter is running on a system. The offline initiation phase can comprise: stopping the application; notifying the application dedicated registry hive driver filter process to stop filter operation associated with the system; and unloading the system independent application dedicated registry hive from the system.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

FIG. 2 is a block diagram of an exemplary application execution method in accordance with one embodiment of the present invention.

FIG. 3 is a block diagram of an exemplary application dedicated registry hive method in accordance with one embodiment of the present invention.

FIG. 5 is a block diagram of exemplary online initiation phase method in accordance with one embodiment of the present invention.

FIG. 6 is a block diagram of exemplary monitoring phase method in accordance with one embodiment of the present invention.

FIG. 7 is a block diagram of exemplary offline initiation phase method in accordance with one embodiment.

DETAILED DESCRIPTION

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, one ordinarily skilled in the art will understand that the present invention may be practiced without these specific details. In other instances, well known methods, procedures, components, and circuits have not been described in detail as not to unnecessarily obscure aspects of the current invention.

Systems and methods that facilitate efficient and effective application registry information storage are presented. The systems and methods can be utilized in a variety of different architectures and environments. In one embodiment, the systems and methods can include a new application dedicated registry hive for application related registry data. Application configuration registry data can be written to an application dedicated registry hive or file on a shared storage resource and loaded in the system namespace as a registry hive. In one exemplary implementation, information associated with various operations is rerouted to the application dedicated registry hive.

Operating system can contain a predefined set of registry hives (e.g., HKCR, HKCU, HKLM, HKU, HKCC, HKPD, etc.). These registry hives can be located on the system volume. In one embodiment, by default the application data can be stored in a file that includes a list of software applications. The data can be stored in a local machine registry key (e.g., HKLM\SOFTWARE registry key, etc.). In one embodiment, the present systems and methods include a solution where the application data is stored under a custom registry hive (e.g., file, etc.) per application on the shared storage. The solution can include an agent (e.g., a cluster agent, etc.) to create/load the registry hive and a registry filter to intercept write operations to the application registry hive on a conditional basis. In one embodiment, the register filter can intercept read operations also. In one exemplary implementation, the agent per-forms various operations including exemplary implementations as set forth in portions of the following detailed description.

Figure 1:
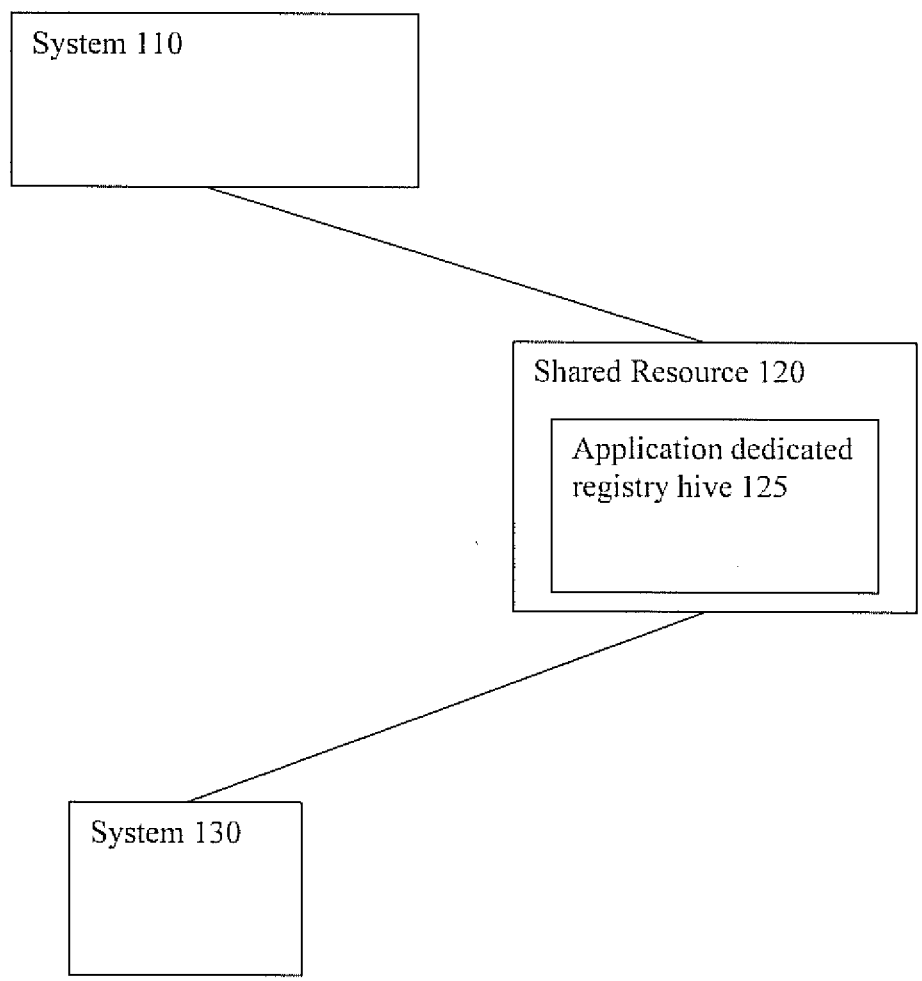
FIG. 1 is a block diagram of an exemplary application dedicated registry hive system in accordance with one embodiment of the present invention.

FIG. 1 is a block diagram of exemplary application dedicated registry hive system 100 in accordance with one embodiment of the present invention. Application dedicated registry hive system 100 includes system 110, shared resource 120 and system 130. Systems 110 and 130 are communicatively coupled to shared resource 120. Configuration information associated with the application is stored in an application dedicated registry hive 125 on shared resource 120. In one exemplary implementation, the application configuration information stored on application dedicated registry hive 125 is system independent. The information stored on application dedicated registry hive 125 can be shared by various different systems as an application switches from one system to another system. The application dedicated registry hive can include a configuration information file and an associated configuration transaction log file.

The components of application dedicated registry hive system 100 cooperatively operate to facilitate efficient and effective application configuration registry information storage. In one embodiment, an application is running on system 110 and application configuration registry information is forwarded to application dedicated registry hive 125 on shared resource 120. In one exemplary implementation, application execution is switched over to system 130 and the application configuration registry information is retrieved from application dedicated registry hive 125 on shared resource 120. If system 130 continues to make additional application configuration registry information changes, the additional application configuration registry information changes are forwarded to application dedicated registry hive 125 on shared resource 120. Additional description of application dedicated registry hives is set forth in following portions of the detailed description.

FIG. 2 is a block diagram of exemplary application execution method 200 in accordance with one embodiment of the present invention. In one embodiment, application execution method 200 facilitates maintenance of configuration registry information while switching application operations from one system to another system. In one exemplary implementation, application execution method 200 uses configuration registry information stored on a shared resource when switching application operations from one system to another system. Application execution method 200 can utilize an application dedicated registry hive method or process to facilitate switching application operations from one system to another system.

In block 210, application operations are performed or executed on a first system while utilizing an application dedicated registry hive method or process. In one embodiment, an application is initiated on the first system and application configuration registry information is tracked utilizing a shared resource. Additional description of application dedicated registry hive methods or processes are set forth in following portions of the detailed description (e.g., descriptions of methods 300, 500, 600, 700, etc.)

In block 220, application operations are switched from the first system to a second system. In one embodiment, switching applications from one system to another system includes utilizing an application dedicated registry hive process to facilitate the switchover. In one embodiment, facilitating the switchover can include retrieving application configuration information from the application dedicated registry hive on the shared resource. It is appreciated that switching from one system to another system can be performed for a variety of reasons (e.g. disaster recovery, fail over any reason, etc.).

In block 230, application operations are performed or executed on the second system while utilizing the application dedicated registry hive method or process. In one embodiment, the application is initiated on the second system and application configuration registry information is retrieved from the shared resource. Additional changes or modifications to the configuration registry information are tracked utilizing the shared resource. Additional description of exemplary application dedicated registry hive methods or processes are set forth in following portions of the detailed description (e.g., descriptions of methods 300, 500, 600, 700, etc.)

FIG. 3 is a block diagram of exemplary application dedicated registry hive method 300 in accordance with one embodiment of the present invention. In one embodiment, application dedicated registry hive method 300 facilitates effective maintenance of application dedicated registry hive information. In one exemplary implementation, a shared resource is utilized to facilitate maintenance of the application dedicated registry hive information.

In block 310, application dedicated registry hive agent operations are performed. In one embodiment the application dedicated registry hive agent operations include an online initiation phase in which a system independent application dedicated registry hive on a shared resource is loaded into the system namespace; a monitoring phase in which status of the system independent application dedicated registry hive is monitored; and an offline initiation phase in which the system independent application dedicated registry hive is unloaded from the system namespace.

In block 320, an application dedicated registry hive driver filter process is performed. In one embodiment, the application dedicated registry hive driver filter process includes redirecting write operations to the system independent application dedicated registry hive. Read operations can also be redirected. It is appreciated the registry filter can be configurable and can be shared by multiple applications (e.g., registry hives, etc.). In one embodiment, registry write operations performed by the application are intercepted by the filter and redirected to the new registry hive with the same path. Read operations can also be intercepted and redirected to the new registry hive with the same path name.

In one embodiment, the system independent application dedicated registry hive includes a registry content file and a corresponding transaction log file. The registry content file can include application configuration information. The corresponding transaction log file includes information tracking application configuration information transactions or changes. The registry content data file is essentially backed by a corresponding transaction log file which can journal the write operations.

In one embodiment, inconsistencies in the system independent application dedicated registry hive information are resolved. As the registry data is binary, the operating system (OS) or an application can use the journal data (e.g., transaction log file information tracking application configuration information transactions or changes, etc.) for recovery (e.g., in case of local and disaster recovery (DR) environments, etc). In the past, backup and restore application program interfaces (APIs) can often result in multiple inputs/outputs (IOs) where as in the new approach the data can be directly written on to the registry hive file.

Figure 4:
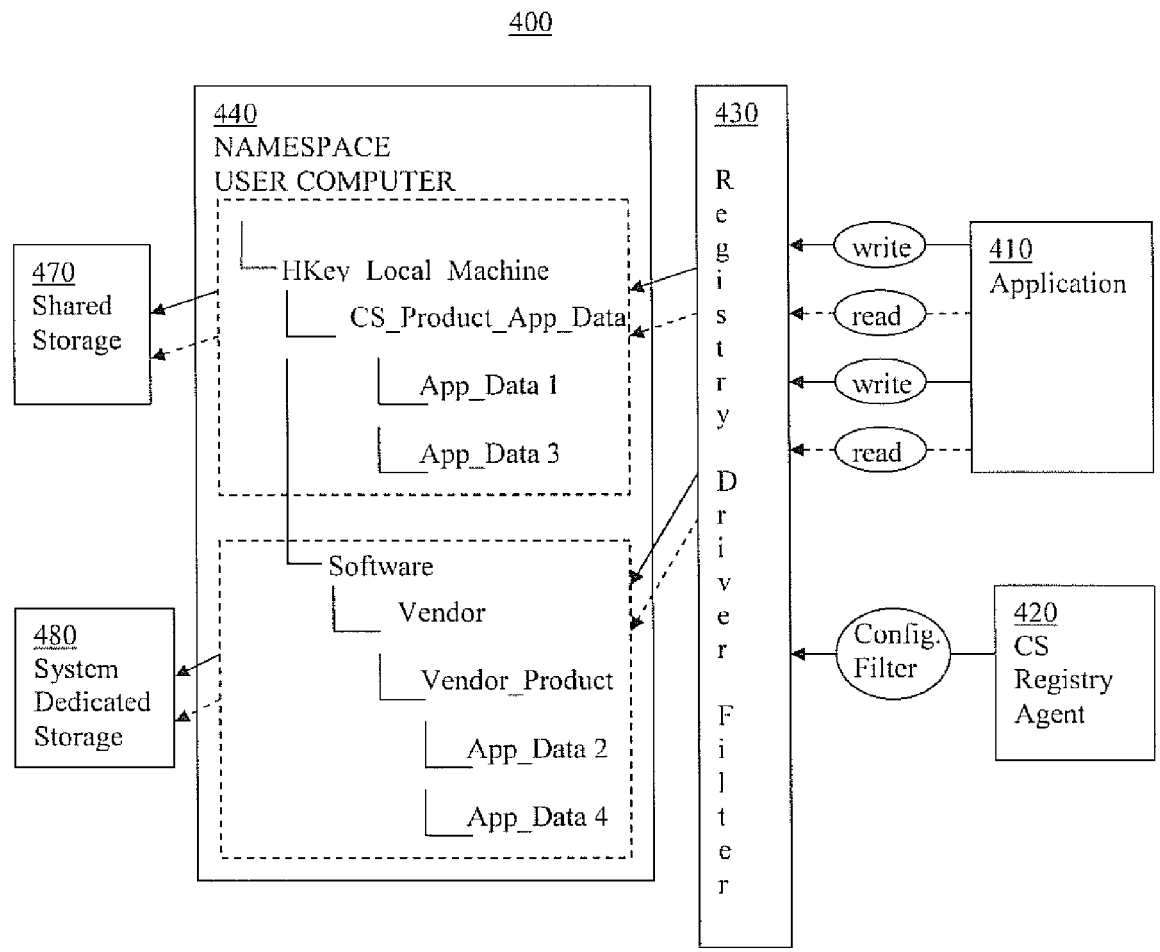
FIG. 4 is a block diagram of an exemplary application dedicated registry hive architecture in accordance with one embodiment of the present invention.

FIG. 4 is a block diagram of exemplary application dedicated registry hive architecture 400 in accordance with one embodiment of the present invention. Application dedicated registry hive architecture 400 includes application 410, cluster server agent 420, registry driver filter 430, namespace 440

(e.g., associated with a user computer system, etc.), shared storage resource 470 and dedicated storage resource 480. Application 410 and cluster server agent 420 are communicatively coupled to registry driver filter 430 which is communicatively coupled to namespace 440 (e.g., associated with a user computer system, etc.), shared storage resource 470 and dedicated storage resource 480.

In one embodiment, the components of application dedicated registry hive architecture 400 cooperatively operate to perform an application dedicated registry hive method (e.g., application dedicated registry hive method 300, 500, 600, 700, etc.). Registry configuration information associated with application 410 (but not specific to the system the application is running on) is stored in the shared storage 470 along with respective transaction log information while a system independent application dedicated registry hive indications (e.g., App_Data 1 and App_Data 3) are included in namespace user computer 440. In one embodiment, additional registry hives other than those predefined and configured by the operating system in the registry configuration is an indication a present new application dedicated registry hive method and system is being implemented. Registry configuration information associated with application 410 (that is specific to the system the application is running on) is stored in the system dedicated storage 480 while a system dependent application dedicated registry hive indications (e.g., App_Data 2 and App_Data 4) are included in namespace user computer 440.

FIG. 5 is a block diagram of exemplary online initiation phase method 500 in accordance with one embodiment of the present invention. In one embodiment, online initiation phase method 500 is a process utilized in an online initiation phase of block 310.

In block 510, a determination is made if a system independent application dedicated registry hive already exists for an application. In one embodiment, the system independent application dedicated registry hive includes a registry content file and a corresponding transaction log file on a shared resource.

In block 520, the system independent application dedicated registry hive is created on the shared resource if the system independent application dedicated registry hive does not already exist. The created system independent application dedicated registry hive can include a registry content file and a corresponding transaction log file on a shared resource.

In block 530, the system independent application dedicated registry hive is loaded from a shared resource into a system namespace. In one embodiment the hive is loaded into the system namespace, REGISTRY, with the no lazy flush (e.g., REG_NO_LAZY_FLUSH) option so that writes are immediately committed instead of the lazy flush mechanism.

In block 540, permissions on the system independent application dedicated registry hive are configured for application access.

In block 550, registry driver filter configuration is directed so that read and write operations for the application are redirected to the system independent application dedicated registry hive. This ensures that operations performed on the registry hive are performed on the registry file on the shared storage.

In block 560, the application is started.

FIG. 6 is a block diagram of exemplary monitoring phase method 600 in accordance with one embodiment of the present invention. In one embodiment, monitoring phase method 600 is a process utilized in a monitoring phase of block 310. In one exemplary implementation, monitoring phase method 600 monitors the status of the system independent application dedicated registry hive.

In block 610, monitoring phase method 600 ensures the system independent application dedicated registry hive is loaded in a system name space.

In block 620, monitoring phase method 600 ensures the application dedicated registry hive driver filter is running on a system.

FIG. 7 is a block diagram of exemplary offline initiation phase method 700 in accordance with one embodiment. In one embodiment, offline initiation phase method 700 is a process utilized in an offline initiation phase of block 310.

In block 710, the application is stopped.

In block 720, the application dedicated registry hive driver filter process is notified to stop filter operation associated with the system.

In block 730, remaining uncompleted write operations are flushed. In one embodiment, flushing the remaining uncompleted write operations ensures the information is consistent. In one exemplary implementation, the flushing is performed as a precautionary or defensive measure with respect loading during an online phase with no lazy flush.

In block 740, the system independent application dedicated registry hive is unloaded from the system. If the unload operation fails, the open handles on this registry hive are closed and then the unload is performed.

It is appreciated an application dedicated registry hive method can be implemented with various redirection scenarios (e.g., redirecting write operations, redirecting read operations, redirecting both write operations and read operations, redirecting write operations and not redirecting read operations, etc.). As set forth in descriptions above, in one embodiment, a new approach registry environment is implemented and write operations are redirected to the new approach registry environment. Read operations can also be redirected to the new approach registry environment.

In one embodiment an application dedicated registry hive method can include write operations that are also directed to a local resource. A write operation can be intercepted and the redirection or forwarding of the write information is split so that the information is forwarded to multiple destinations. In one exemplary implementation, the write operation information is forwarded for storage in both a registry environment similar to a conventional approach and also redirected to a new approach registry environment. The registry environment similar to a conventional approach can include a traditional non-shared resource while the new approach registry environment can include a shared resource. In one exemplary implementation, the same blocks or content of binary information is stored in both locations (e.g. the registry environment similar to a conventional approach and also redirected to a new approach registry environment)

It is appreciated that an application dedicated registry hive method can be implemented with various read operation direction scenarios. As set forth above, in one embodiment, a new approach registry environment is implemented and both write and read operations are redirected to the new approach registry environment. A read operation can be redirected to the new approach registry environment even though a write operation is "split" and the information is stored in both the conventional and new approach registry environments. In one embodiment, a read operation can be performed based upon the conventional registry environment approach while the write operation is "split" such that the information is stored in both the conventional and new approach registry environment.

It is also appreciated that consistency maintenance features can be adapted or implemented in various scenarios. As indicated in previous sections of the detailed description, system independent application dedicated registry hive information stored on shared resources can include information (e.g., transaction log file information, etc.) for resolving inconsistencies. In one embodiment, similar inconsistency resolution information can be also stored with or added to a conventional registry environment approach. In one exemplary implementation where the write redirection is "split" and the registry configuration information is written to both a shared resource and a non-shared resource, a configuration registry transaction log similar to the transaction log on the shared resource can also be added to and maintained on the non-shared resource.

Figure 8:
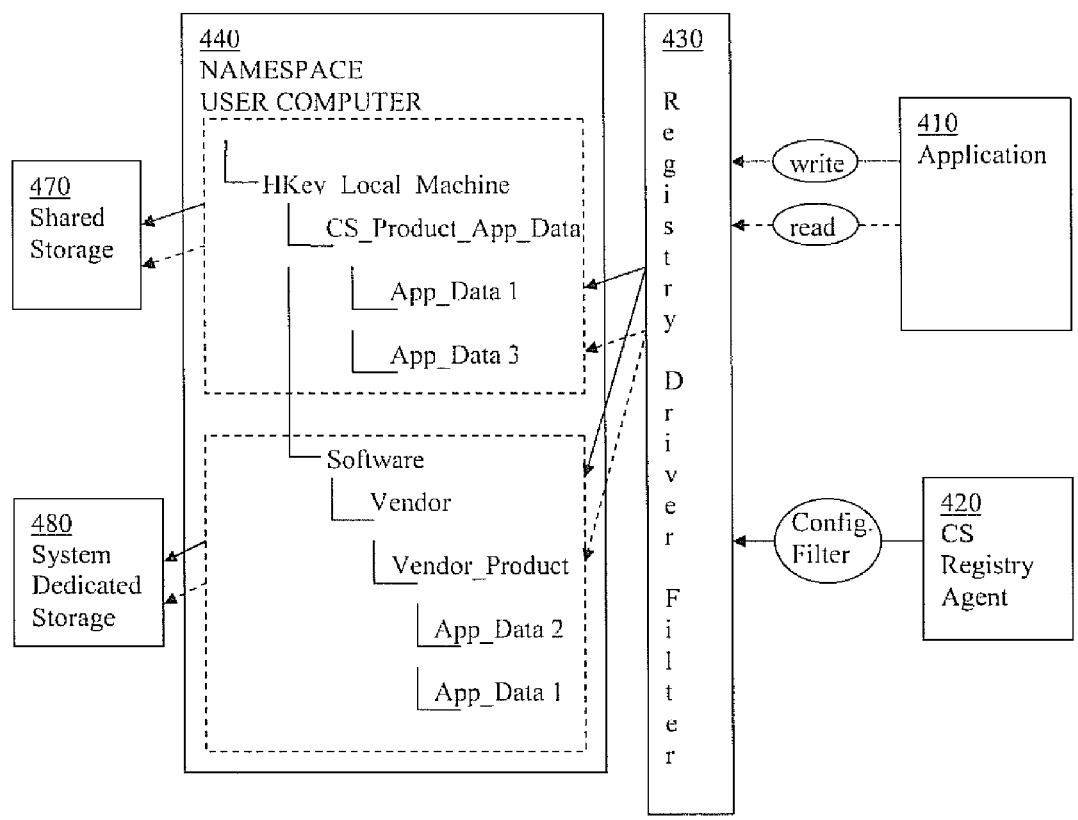
FIG. 8 is a block diagram of exemplary application dedicated registry hive architecture in accordance with one embodiment of the present invention.

FIG. 8 is a block diagram of exemplary application dedicated registry hive architecture 800 in accordance with one embodiment of the present invention. In one embodiment, application dedicated registry hive architecture 800 is similar to application dedicated registry hive architecture 400, except application dedicated registry hive architecture 800 includes application configuration registry data written to both the shared resource and the dedicated resource. For example, configuration data App_Data 1 is written to both the shared resource and the dedicated resource. Depending upon the mode or operation, the configuration registry information can be read from either the shared resource or the dedicated resource.

The present application dedicated registry hive approaches can make registry data highly available with transaction level consistency. The present application dedicated registry hive approaches can be implemented at least in part in a cluster server environment. In one exemplary implementation, present application dedicated registry hive approaches can make registry data highly available with transaction level consistency for an application on the failover node in a cluster server environment.

Figure 9:
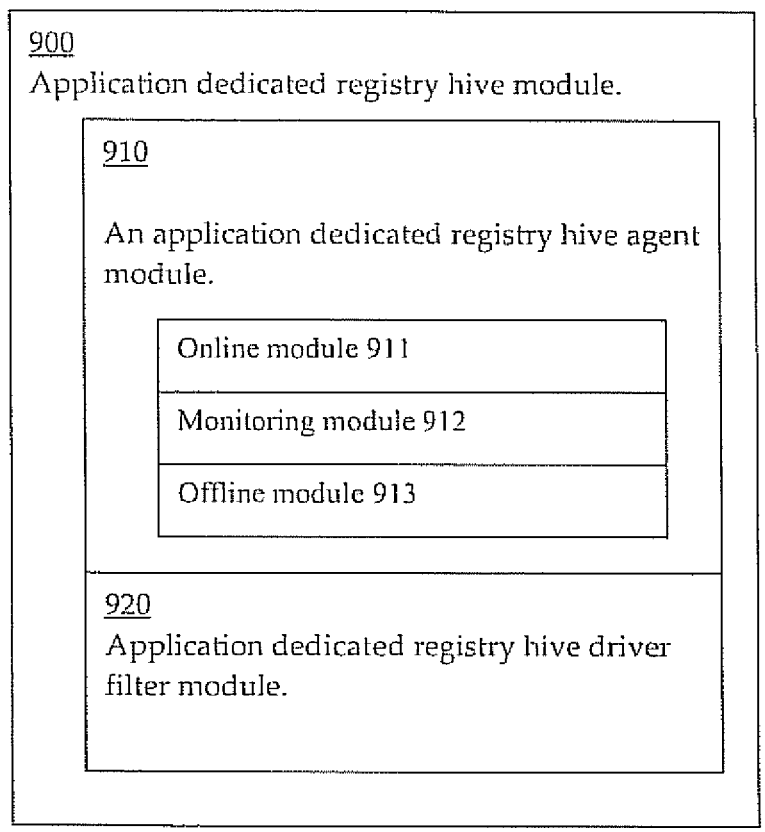
FIG. 9 is a block diagram of an exemplary application dedicated registry hive module in accordance with one embodiment of the present invention.

FIG. 9 is a block diagram of application dedicated registry hive module 900 which includes instructions for directing a processor in the performance of an application dedicated registry hive process (e.g., application dedicated registry hive method 300, etc.) in accordance with one embodiment of the present invention. Application dedicated registry hive module 900 includes application dedicated registry hive agent module 910 and application dedicated registry hive driver filter module 920. Application dedicated registry hive agent module 910 includes online module 911, monitoring module 912 and offline module 913. Application dedicated registry hive agent module 910 includes instructions for performing application dedicated registry hive agent operations. In one embodiment, application dedicated registry hive agent module 910 includes instructions for application dedicated registry hive agent operations as indicated in block 310. Application dedicated registry hive driver filter module 920 includes instructions for performing application dedicated registry hive driver filter operations. In one embodiment, virus analysis module 920 includes instructions for application dedicated registry hive driver filter operations as indicated in block 320.

Figure 10:
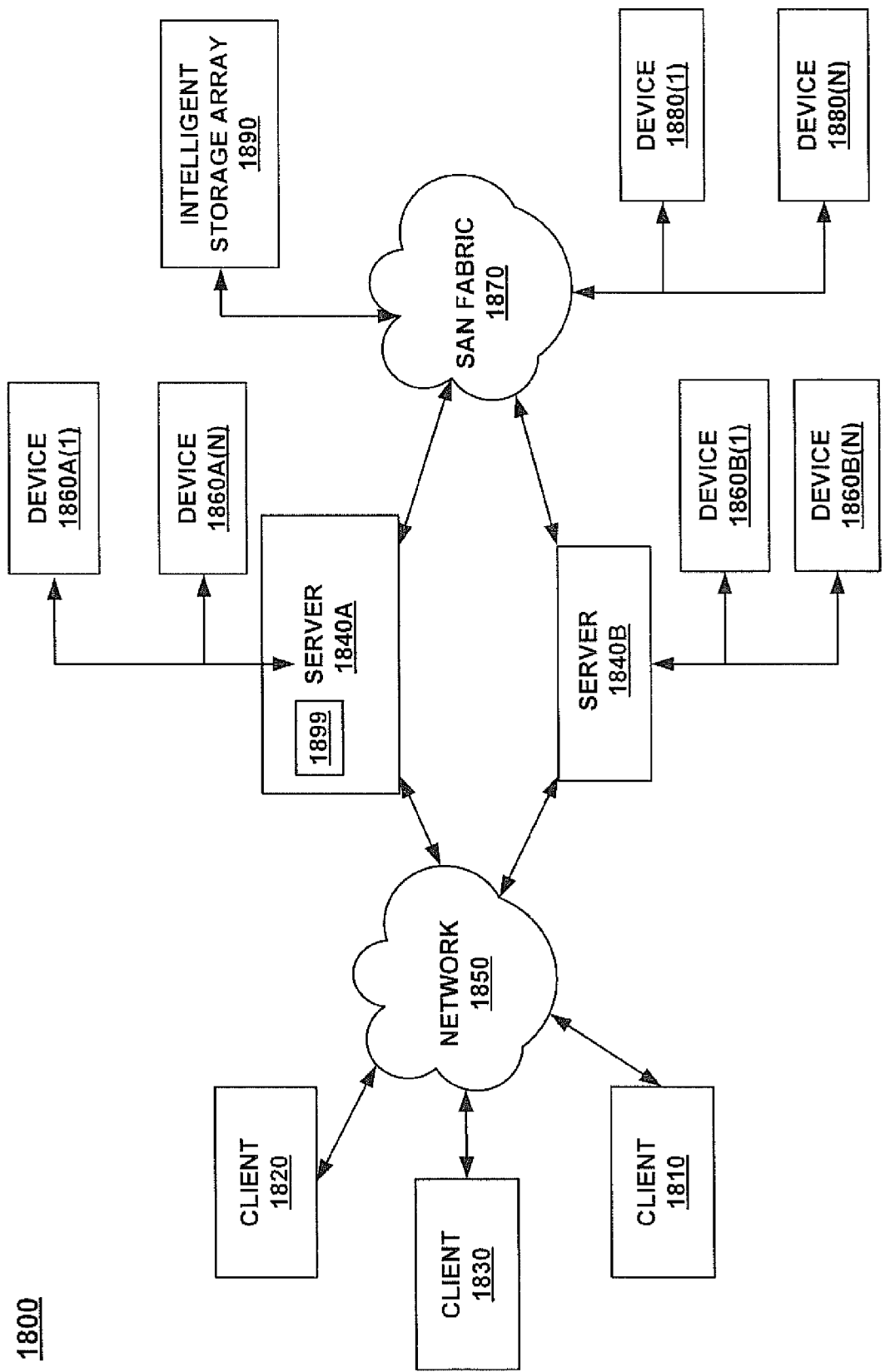
FIG. 10 is a block diagram depicting a network architecture in accordance with one embodiment of the present invention.

It is appreciated present application dedicated registry systems and methods can be implemented as part of a variety of environments. For example, application dedicated registry hive systems and methods can be implemented as part of a distributed computing environment, a cloud computing environment, a virtual environment, a client server environment, etc. In one embodiment, an application dedicated registry hive method (e.g., application dedicated registry hive method 100, etc.) can be implemented on a network. FIG. 10 is a block diagram depicting a network architecture 1800 in which client systems 1810, 1820 and 1830, as well as storage servers 1840A and 1840B (any of which can be implemented using computer system 1110), are coupled to a network 1850. Storage server 1840A is further depicted as having storage devices 1860A (1)-(N) directly attached, and storage server 1840B is depicted with storage devices 1860B (1)-(N) directly attached. Storage servers 1840A and 1840B are also connected to a SAN fabric 1870, although connection to a storage area network is not required for operation of the disclosure. SAN fabric 1870 supports access to storage devices 1880(1)-(N) by storage servers 1840A and 1840B, and so by client systems 1810, 1820 and 1830 via network 1850. Intelligent storage array 1890 is also shown as an example of a specific storage device accessible via SAN fabric 1870. In one embodiment, server 1840A includes application dedicated registry hive module 1899. In one embodiment, an application dedicated registry hive module 1899 is similar to application dedicated registry hive module 900. It is appreciated that present systems and methods are compatible with a variety of implementations. For example, portions of information and instructions associated with can be distributed in various resources.

Figure 11:
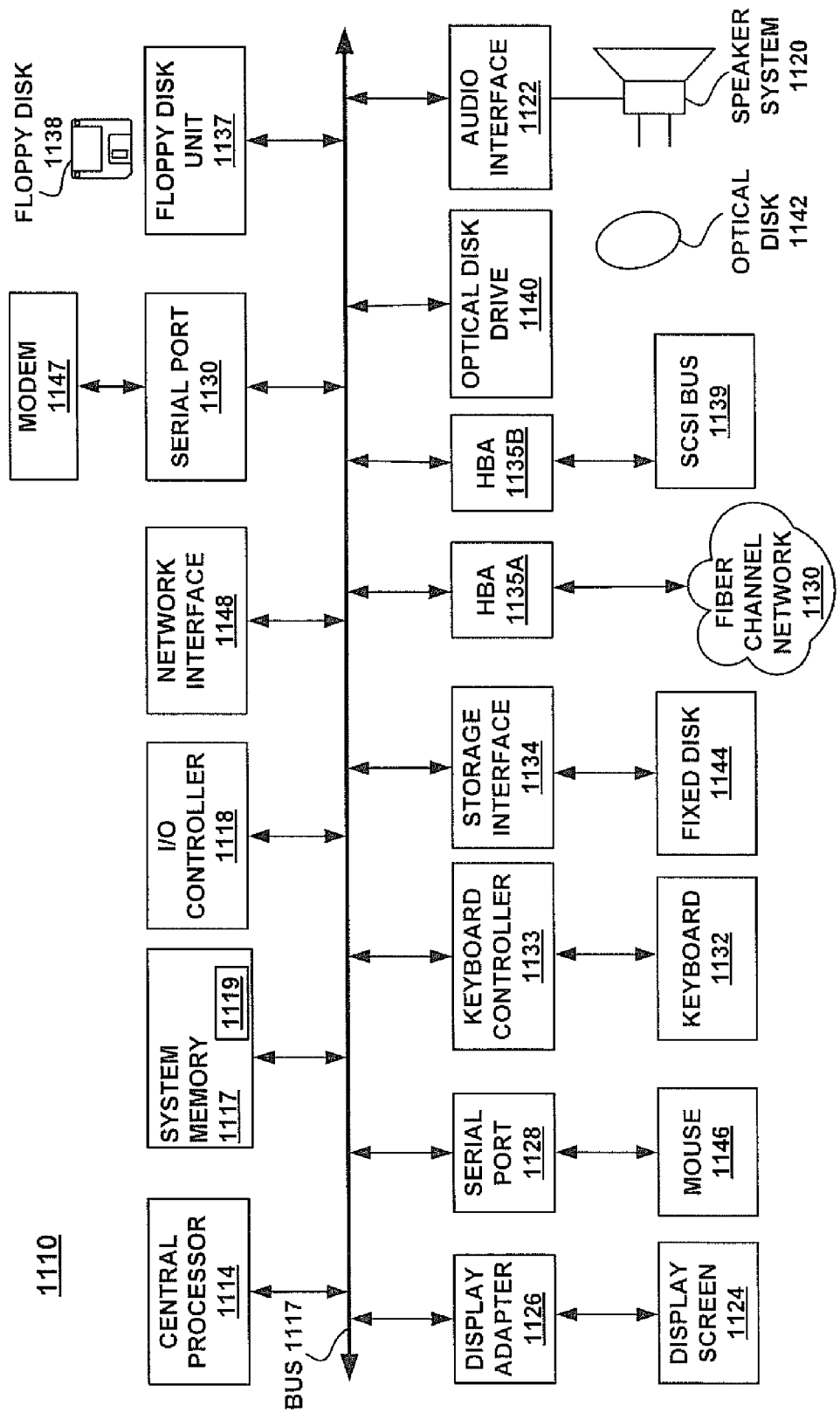
FIG. 11 depicts a block diagram of an exemplary computer system suitable for implementing the present methods in accordance with one embodiment of the present invention.

FIG. 11 depicts a block diagram of an exemplary computer system 1110 suitable for implementing the present methods. Computer system 1110 includes a bus 1177 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fiber Channel network 1190, a host bus adapter (HBA) interface card 1135B operative to connect to a SCSI bus 1139, and an optical disk drive 1140 operative to receive an optical disk 1142. Also included are a mouse 1146 or other point-and-click device (coupled to bus 1112 via serial port 1128), a modem 1147 (coupled to bus 1112 via serial port 1130), and a network interface 1148 (coupled directly to bus 1112).

Bus 1177 allows data communication between central processor 1114 and system memory 1117, which may include read-only memory (ROM) or flash memory (neither shown), and random access memory (RAM) (not shown), as previously noted. In one embodiment, instructions for performing an application dedicated registry hive method (e.g., similar to application dedicated registry hive method 300, etc.) are stored in one or more memories of computer system 1100 (e.g., in memory location 1119). The RAM is generally the main memory into which the operating system and application programs are loaded. In one embodiment, RAM 1117 includes an application dedicated registry hive module (e.g., in memory location 1119). In one embodiment, an application dedicated registry hive module stored in memory location 1119 is similar to application dedicated registry hive module 800. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), floppy disk unit 1137, or other storage medium. Additionally, applications can be in the form of electronic signals modulated in accordance with the application and data communication technology when accessed via network modem 1147 or interface 248.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 11 need not be present to practice the present disclosure. The devices and subsystems can be interconnected in different ways from that shown in FIG. 11. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 1110, modem 1147, network interface 1148 or some other method can be used to provide connectivity from each of client computer systems 1810, 1820 and 1830 to network 1850. Client systems 1810, 1820 and 1830 are able to access information on network addressable storage using, for example, a transfer coordination component, a web browser, or other client software (not shown). Such a client allows client systems 1810, 1820 and 1830 to access data hosted by storage server 1840 or 1880 or one of the corresponding storage devices. FIG. 11 depicts the use of a network such as the Internet for exchanging data, but the present disclosure is not limited to the Internet or any particular network-based environment.

Thus, the present systems and methods facilitate efficient and effective application registry information storage. In one embodiment, application registry information can be performed independently with no or minimal dependence on specific system configurations. The present application dedicated registry hive approaches facilitate efficiency in terms of performance (e.g., CPU/IC, etc.) and can allow registry configuration high availability (HA) to be made with transaction level consistency. Since the data is transaction consistent it no longer faces issues of arbitrary data inconsistency for local and disaster recovery (DR) failovers. In the past, there may have been issues with cluster server environments being unable to restore the configuration in DR, as the registry data in case of backup and restore is usually binary and often provides no recovery mechanism. However, with the new present approach of creating a new registry hive with transaction log, this facilitates loading the registry configuration like a database. In case of local high availability HA, conventional backup/restore registry application program interfaces (APIs) typically do not scale for large configuration and result in system instability, whereas the new approach facilitates scaling for large configurations and reduction in system instability. Unlike conventional attempts that included resource intensive replication an entire system image, the present application dedicated registry hive approaches can be performed at a varying granular levels (e.g., application, registry configuration, etc.).

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device.

The computer readable medium can include reprogrammable non-transient tangible computer readable media. By way of example, and not limitation, computer readable medium may comprise computer storage media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies carrier waves or other transport mechanism and includes any information delivery media. By way of example, and not limitation, communication media includes wired media such as a wired network or direct-wired connection, and wireless media such as acoustic, RF, infrared, other wireless media, and combinations of any of the above.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:

1. An application dedicated registry hive method comprising:
    performing application dedicated registry hive agent operations, including:
        a first online initiation phase in which a system independent application dedicated registry hive from a shared resource is loaded into a first system namespace;
        a monitoring phase in which status of said system independent application dedicated registry hive is monitored;
        an offline initiation phase in which said system independent application dedicated registry hive is unloaded from the first system namespace; and
        a second online initiation phase in which said system independent application dedicated registry hive is loaded into a second system namespace; and
    performing an application dedicated registry hive driver filter process, including redirecting write operations to said system independent application dedicated registry hive, wherein said redirecting comprises intercepting registry write operations performed by the application and redirecting intercepted registry write operations to a new registry hive with a same path as said system independent application dedicated registry hive.

2. The application dedicated registry hive method of claim 1 wherein said system independent application dedicated registry hive includes a registry content file and a corresponding transaction log file.

3. The application dedicated registry hive method of claim 1 wherein said performing an application dedicated registry hive driver filter process includes redirecting read operations to said system independent application dedicated registry hive.

4. The application dedicated registry hive method of claim 1 wherein said online initiation phase comprises:
    determining if a system independent application dedicated registry hive already exists for an application, wherein said system independent application dedicated registry hive includes a registry content file and a corresponding transaction log file on a shared resource;
    creating said system independent application dedicated registry hive on said shared resource if said system independent application dedicated registry hive does not already exist;
    loading said system independent application dedicated registry hive into a system namespace;
    configuring permissions on said system independent application dedicated registry hive for application access;
    directing registry driver filter configuration so that said write operations for the application are redirected to said system independent application dedicated registry hive; and
    starting the application.

5. The application dedicated registry hive method of claim 1 wherein said monitoring phase includes:
    determining that said system independent application dedicated registry hive is loaded in a system name space; and
    determining that said application dedicated registry hive driver filter is running on a system.

6. The application dedicated registry hive method of claim 1 wherein said offline initiation phase comprises:
    stopping said application;
    notifying said application dedicated registry hive driver filter process to stop filter operation associated with said system; and
    unloading said system independent application dedicated registry hive from said system.

7. The application dedicated registry hive method of claim 1 wherein said write operations are also directed to a local resource and information associated with said write operations is also stored on said local resource.

8. The application dedicated registry hive method of claim 1 further comprising resolving inconsistencies in said system independent application dedicated registry hive information.

9. A non-transitory reprogrammable tangible computer readable storage medium having stored thereon, computer executable instructions that, when executed by a computer system cause the computer system to perform a method comprising:
    performing application dedicated registry hive agent operations, including:
        a first online initiation phase in which a system independent application dedicated registry hive from a shared resource is loaded into a first system namespace;
        a monitoring phase in which status of said system independent application dedicated registry hive is monitored;
        an offline initiation phase in which said system independent application dedicated registry hive is unloaded from the first system namespace; and a second online initiation phase in which said system independent application dedicated registry hive is loaded into a second system namespace; and performing an application dedicated registry hive driver filter process, including redirecting write operations to said system independent application dedicated registry hive, wherein said redirecting comprises intercepting registry write operations performed by the application and redirecting intercepted registry write operations to a new registry hive with a same path as said system independent application dedicated registry hive.

10. The non-transitory reprogrammable tangible computer readable storage medium of claim 9 wherein said system independent application dedicated registry hive includes a registry content file and a corresponding transaction log file.

11. The non-transitory reprogrammable tangible computer readable storage medium of claim 9 wherein said performing an application dedicated registry hive driver filter process includes redirecting read operations to said system independent application dedicated registry hive.

12. The non-transitory reprogrammable tangible computer readable storage medium of claim 9 wherein said online initiation phase comprises:
    determining if a system independent application dedicated registry hive already exists for an application, wherein said system independent application dedicated registry hive includes a registry content file and a corresponding transaction log file on a shared resource;
    creating said system independent application dedicated registry hive on said shared resource if said system independent application dedicated registry hive does not already exist;
    loading said system independent application dedicated registry hive into a system namespace;
    configuring permissions on said system independent application dedicated registry hive for application access;
    directing registry driver filter configuration so that said write operations for the application are redirected to said system independent application dedicated registry hive; and
    starting the application.

13. The non-transitory reprogrammable tangible computer readable storage medium of claim 9 wherein said monitoring phase includes:
    determining that said system independent application dedicated registry hive is loaded in a system name space; and
    determining that said application dedicated registry hive driver filter is running on a system.

14. The non-transitory reprogrammable tangible computer readable storage medium of claim 9 wherein said offline initiation phase comprises:
    stopping said application;
    notifying said application dedicated registry hive driver filter process to stop filter operation associated with said system; and
    unloading said system independent application dedicated registry hive from said system.

15. The non-transitory reprogrammable tangible computer readable storage medium of claim 9 wherein said write operations are also directed to a local resource and information associated with said write operations is also stored on said local resource.

16. The non-transitory reprogrammable tangible computer readable storage medium of claim 9 further comprising resolving inconsistencies in said system independent application dedicated registry hive information.

17. A computer system, comprising:
    a processor coupled to a computer readable storage media and executing computer readable code which causes the computer system to perform operations including:
    performing application dedicated registry hive agent operations, including:
        a first online initiation phase in which a system independent application dedicated registry hive from a shared resource is loaded into a first system namespace;
        a monitoring phase in which status of said system independent application dedicated registry hive is monitored;
        an offline initiation phase in which said system independent application dedicated registry hive is unloaded from the first system namespace; and
    a second online initiation phase in which said system independent application dedicated registry hive is loaded into a second system namespace; and
    performing an application dedicated registry hive driver filter process, including redirecting write operations to said system independent application dedicated registry hive, wherein said redirecting comprises intercepting registry write operations performed by the application and redirecting intercepted registry write operations to a new registry hive with a same path as said system independent application dedicated registry hive.

18. The computer system of claim 17 wherein said system independent application dedicated registry hive includes a registry content file and a corresponding transaction log file.

19. The computer system of claim 17 wherein said performing an application dedicated registry hive driver filter process includes redirecting read operations to said system independent application dedicated registry hive.

20. The computer system of claim 17 wherein said online initiation phase comprises:
    determining if a system independent application dedicated registry hive already exists for an application, wherein said system independent application dedicated registry hive includes a registry content file and a corresponding transaction log file on a shared resource;
    creating said system independent application dedicated registry hive on said shared resource if said system independent application dedicated registry hive does not already exist;
    loading said system independent application dedicated registry hive into a system namespace;
    configuring permissions on said system independent application dedicated registry hive for application access;
    directing registry driver filter configuration so that said write operations for the application are redirected to said system independent application dedicated registry hive; and
    starting the application.

21. The computer system of claim 17 wherein said monitoring phase includes:
    determining that said system independent application dedicated registry hive is loaded in a system name space; and
    determining that said application dedicated registry hive driver filter is running on a system.

22. The computer system of claim 17 wherein said offline initiation phase comprises:
    stopping said application;
    notifying said application dedicated registry hive driver filter process to stop filter operation associated with said system; and unloading said system independent application dedicated registry hive from said system.

23. The computer system of claim 17 wherein said write operations are also directed to a local resource and information associated with said write operations is also stored on said local resource.

24. The computer system of claim 17 further comprising resolving inconsistencies in said system independent application dedicated registry hive information.

\* \* \* \* \*